Patented Nov. 11, 1924.

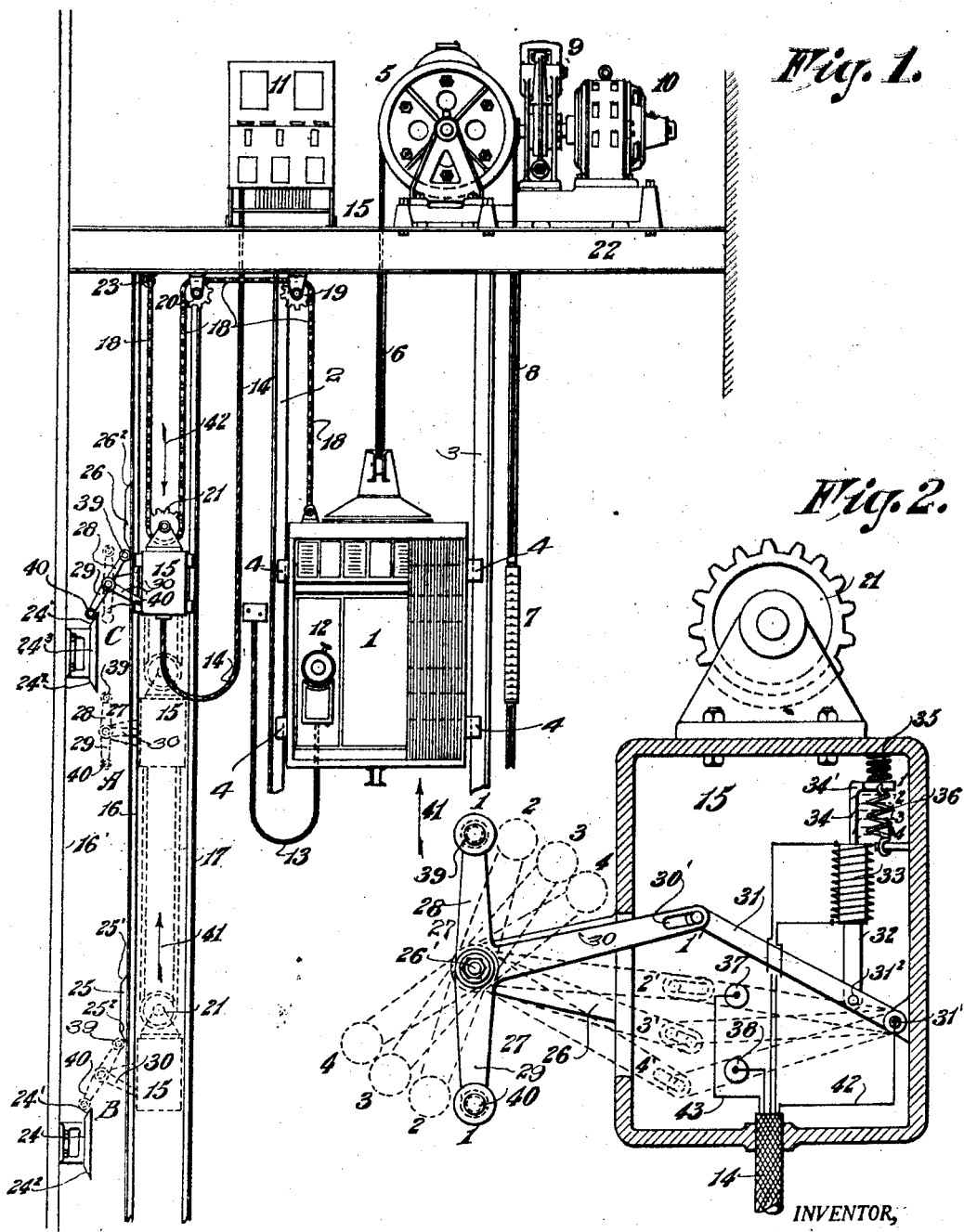

1,515,209

UNITED STATES PATENT OFFICE.

NAPOLEON P. JULIEN, OF SPRINGFIELD, MASSACHUSETTS, ASSIGNOR TO OTIS ELEVATOR COMPANY, OF JERSEY CITY, NEW JERSEY, A CORPORATION OF NEW JERSEY.

LEVELING DEVICE FOR ELECTRICAL ELEVATORS.

Application filed December 18, 1923. Serial No. 681,443.

*To all whom it may concern:*

Be it known that I, NAPOLEON P. JULIEN, a subject of the King of England, residing at Springfield, in the county of Hampden and State of Massachusetts, have invented new and useful Improvements in Leveling Devices for Electrical Elevators, of which the following is a specification.

This invention relates to improvements in the control of electrically operated elevators.

An object of the invention is to provide a device, or devices, by means of which the speed or rate of travel of the car can be quickly and accurately adjusted so that the platform of the car may be brought to a level and to a positive stop at a floor landing and in either the upward or downward movement of the car.

Heretofore, attempts have been made to bring the platform of the elevator car into close registration with the floor or landing platform. The efforts in this direction have been only partially successful, due primarily to the fact that the normal or usual rate, or speed of travel, is so high that the momentum of the car will cause it to travel beyond the point at which it is desired to stop, or, the speed is cut down before the car reaches its landing permitting the car to travel slowly until the landing is reached. This is objectionable as it results in materially reducing the capacity of the car. Some of the efforts that have been made to accurately and quickly level the car with the landing employ two electrically operated motors one being for the so-called high or normal speed travel and the other for the so called low speed of the car which is utilized for the starting and leveling purposes. The use of these two motors has not been found to be entirely satisfactory due to the fact that the system is more or less complicated, and, further that the devices employed to control the electric circuits would not positively bring the car to rest and its platform into registration with the floor landing.

Broadly considered, my improvement comprehends an auxiliary motor controlling device by means of which, when the operator operates the controller in the car to cause the main supply current to cut down the normal speed of the car operating motor from fast to slow speed as the car approaches a landing, whereby the normal speed of the car is materially reduced, say from 300 feet per minute to 50 feet per minute, at which time the auxiliary motor controlling device will then come into operation to bring about the stopping of the car at the landing desired. In order to accomplish this result I provide a flexible connecting mechanism between the car and the auxiliary motor controlling device which mechanism is so constructed and arranged that it will cause this device to travel at a very much slower speed, or rate of travel, than that of the car, whereby practically all possibility of the car over running the desired landing is prevented.

The auxiliary motor controlling device or travelling car is electrically connected to the operator's control box in the car and is designed to travel at one half, one third, or any desired fractional part of the high speed travel of the car, that is to say; if the normal speed of 300 feet per minute of the car is reduced to say 50 feet per minute by making suitable electrical connections with the slow speed winding of the single and main traction motor, then, the auxiliary motor controlling device would be travelling at a speed or rate of only 25 feet, or, 16⅔ per minute, respectively. Provision is therefore made whereby the speed of travel of the auxiliary motor controlling or travelling box device for the purpose of leveling the car may have any desired ratio or fractional part between the slow speed travel of the car and the said auxiliary motor controlling device as will be fully described in the body of the specification with reference to the accompanying drawings and appended claims. An important advantage of the present improvement is that an elevator already installed may be readily changed so that the normal speed of the car may be materially increased, and, at the same time have it under control so that it may be readily brought to stop at a landing; or, if desired, the normal speed of the car may be retained and the devices connected whereby an accurate landing may be effected.

Referring to the drawings:

Fig. 1 is a diagrammatic view showing the general arrangement and the operating mechanism between the car and the auxiliary motor controlling device or travelling box, and Fig. 2 is a detail view of the electro-magnetic mechanism of the box which is controlled by the operator in the car for bringing the auxiliary motor controlling device into operation for accurately leveling the car with the landing.

Referring to the drawings in detail:

1 designates the car which may represent either a freight or passenger one, 2 and 3 the T-shaped guide or runway irons on which the shoes 4 of the car slide. Located above the car is the traction drum 5 around which the lifting cables 6 are wrapped, only one of which is shown; the usual counterweight is indicated at 7 and its supporting cable at 8. The usual brake mechanism is indicated at 9, the main operating, and single lifting motor at 10, and the usual motor controlling switch board at 11. Located within the car is the operator's main controlling switch 12, with the cable 13 leading therefrom to the switch controller 11, and a cable 14 leading to the auxiliary motor controlling switch box 15 which is mounted for reciprocating movement on the vertically arranged guides or runways 16 and 17. This box is supported for movement by means of the chain connection 18, one end of which is attached to the car 1 and passes upward over the supporting sprocket wheels 19 and 20, then downward under the sprocket wheel 21, which is attached to the upper end of the travelling auxiliary switch box 15, then upward to the supporting beam 22 to which it is attached at 23. This arrangement of flexible connection between the car 1 and the travelling box 15 will cause this box to travel at one half of the speed of the car 1, as readily understood. It is to be understood that I do not limit myself to this particular flexible connection between the car 1 and box 15 in which the auxiliary motor controlling switch mechanism is located as more than a single strand of flexible connections may be employed as a double or triple roving between the sprocket wheel 21 and support 23, whereby the rate or speed of travel of the box 15 may be materially reduced when compared with the speed or travel of the car 1.

Located on the runways 16 and 16' are the cam blocks 24 and 25 having the inclined or cam surfaces 24' and 24² and 25' and 25² for the purpose of controlling the current which flows to the main traction motor 10 when this motor is operating at low speed, it being understood the operator of the car has moved the handle of the controller box 12 so that the motor 10 is being operated at low speed as the car 1 approaches a landing. It is also to be understood that the cam blocks 24 and 25 are located for each of the floor landings and those shown are illustrative of two landings.

Attached to the box 15 is a rigid arm 26, and pivotally connected to the arm 26 at 26' is the T-shaped lever 27 having the arms 28, 29, and 30. Pivotally connected to the arm 30, by a slot and pin connection 30', is the metallic link 31 which is pivotally connected to the box 15 at 31'. Attached to the link 31 at 31² is the plunger 32 of a solenoidal winding 33. Connected to the plunger 32 is the upwardly extending part 34 having the arm portion 34' to which are attached the springs 35 and 36 for normally retaining the plunger 32 in its normal or middle position but will permit the plunger to readily move in either direction when the solenoid is electrically energized depending upon the direction of the current flowing through the turns of the solenoid. 37 and 38 are contact buttons with which the metallic link 31 engages to close the circuit to the slow speed windings of the motor 10. Mounted on the ends of the arms 28 and 29 are the cam engaging rollers 39 and 40 which engage the inclined surfaces 24' and 24² and 25' and 25² of the cam blocks 24 and 25.

Referring now to the operation of the car leveling mechanism. First consider the car as moving upward in the direction indicated by the arrow 41. The position of the arms 28 and 29 of the double armed lever 27 are as shown in dotted lines at A and C in Fig. 1, that is to say they are in a vertical plane or position.

They will then freely pass by all of the cams 24 and 25 without contacting with any one of them as is clearly shown in the drawings. The springs 35 and 36 operate to retain the arms in the vertical position. Should it be desired to stop the car the operator moves the car control handle of the box 12 into a position for allowing the supply of electric current to flow to the slow speed winding of the main traction motor 10 which causes the normal speed of the car to be reduced to say from 300 feet per minute to say 50, and at the same time the speed or rate of travel of the auxiliary motor controlling box 15 is reduced to one half that of 50 feet or 25 feet per minute. When the operator moves his control lever in the box 12 to the slow speed position the current at the same time flows through the solenoid winding 33 of the box 15 (see Fig. 2) which causes the core or plunger 32 to move the link 31 from the full line or normal position 1' of the arm 30 to the dotted position 2' and the lower end 29 of the T-shaped lever 27 into the path of the cam 24 as indicated at C. Current now flows from the main wire 43 to the button 37, lever 31, wire 42 to the cable 14, switch control board 11 to the slow speed winding of the motor 10. Since the box 15 is now moving downward at only 25 feet per minute by reason of the speed reduction, connection between the car 1 and box 15 there is no danger of the car 1 being carried beyond its landing before the current to the slow speed motor is cut off which will be when the roller 40, in position C, engages the inclined surface 24' of the cam 24 when the arm 29 of the T-shaped lever 27 will be moved into the dotted position 2 and the arm 30' into the position 3' which automatically opens the circuit to the slow speed winding of the single main traction motor 10. At the same time the current through the solenoidal winding 33 is broken which removes the magnetic pull on the plunger or core 32 permitting the springs 35 and 36 to return the arms 28 and 29 of the T-shaped lever 27 to their normally inclined position indicated at B and C whereby, when the car 1 is again started the arms will contact with any of the cams 24 or 25. Should the car 1 fail to stop at the landing required and over run its stopping position; the roller 40 will pass onto the surface 24³ of cam 24 with the result that the link 31 will be moved into engagement with the contact 38 or position 4' of the link 31. This will cause an electric current to flow to the slow speed winding of the motor 10 and solenoid 33 in an opposite direction and cause the car 1 to travel downward until the roller 40 passes onto the inclined surface 24' and the roller 39 to engage the inclined surface 26' of the cam 26 above, which will move the arm 30 and link 31 to the dotted line position 3' and open the circuit to the slow speed winding of the motor 10, thus leveling the car.

Now consider the car 1 as moving downward and the box 15 upward as indicated by the arrow 41 in the B position and it is desired to bring the car to a stop and at the same time level it with the landing. The operator moves the handle of the controller box 12 into the slow speed notch on the downward travel of the car. This closes the circuit through the solenoidal winding 33, causing the plunger 32 to move the link 31 into the position indicated at 4' and into engagement with the contact 38 whereby the roller 39 will engage the inclined surface 25² of the cam 25, and open the circuit by moving the link into the open circuit position indicated at 3'. Should the car 1 fail to come to rest or in registration with the floor landing and over run the desired stopping position, the roller 39 (see position B) would pass up the inclined surface 25² of the cam 25 and onto the surface 25' which operation would move the T-shaped lever 27 so that the link 31 would engage the contact 37 which would reverse the direction of the flow of current through the low speed winding of the motor and also through the solenoid winding 33 whereby the car 1 would be moved upward until the roller 40 would engage the inclined surface 24' as before, and move the link 31 to the dotted line position 3' and open the circuit to the slow speed winding of the motor. It is of course to be understood that when no current is flowing through the solenoidal winding 33 that the arms 28 and 29 will stand in the inclined position shown in dotted lines at positions indicated at B and C, for the reason that should the car, 1, for instance settle the link 31 would be moved by the cam 24 into engagement with the contact 38 and cause the car to rise until the circuit in the slow speed winding of the motor would be opened or assume the dotted line position 3'.

It is also to be understood that I do not specifically limit myself to the location of the switches on the box 15 and the cams on the guide rod 16 and rod 16'.

It is to be understood that the pairs of cam blocks are located in the upper part of the well may and are so arranged and spaced from each other that a pair is provided for each landing, and, the distance between these blocks is one half of the distance between the floor landings. The box 15 therefore travels one half of the height of the height of all of the landings.

What I claim is:

1. An elevator leveling mechanism comprising, in combination, a car, means for raising and lowering the same, a device on the car for directly controlling the operation of the raising and lowering motor means, an auxiliary contact carrying device connected to the car for controlling the operation of the car raising and lowering mechanism for causing the car to automatically assume a position of rest with the landing and independent of the operation of the device on the car which directly controls the operation of the raising and lowering means, the carrying device being so connected to the car so as to travel at a lower rate of travel than the car.

2. In an electrically operated elevator, motor means for raising and lowering the car thereof, means for changing the operation of the motor means for changing the rate of travel of the car, auxiliary means for controlling the motor means which in turn changes the rate of travel of the car, the auxiliary means including a travelling member having electrically operated switches thereon which are electrically connected to the motor means, and the said travelling member being connected to the car, the connection being such that the travelling member moves at a much slower rate of travel than the car, and means adjacent the travelling member for operating the switches thereon for changing the direction of travel of the car.

3. A leveling device for electrical operated elevators comprising a combination, an electric motor for raising and lowering the elevator car, said motor having a two speed winding construction, means on the car for changing the electrical connection with the source of power for varying the rate of travel of the car, a travelling box member connected to the car whereby the member is operated from the car and at a rate of travel less than that of the car and means associated with the box member for automatically opening and closing the electric circuit to the low speed winding of the motor for the purpose of leveling the car, said associated means being so constructed and arranged that should the car over run its leveling position, the direction of travel of the car would be reversed and return it to its proper elevation where it would be brought to a position of rest, as described.

4. In a leveling device for elevators comprising in combination, means for operating the car, means for controlling the movements of the car for leveling purposes, comprising a travelling member, connecting means between the car and the said member, the connecting means being so constructed and arranged that the rate of travel of the member is less than rate of travel of the car, and means carried by the member for controlling the operation of the car operating means.

5. In a leveling device for elevators comprising in combination, means for operating the car, means for controlling the movements of the car for leveling purposes comprising a travelling member, connecting means between the car and the said member, the connecting means being so constructed and arranged that the rate of travel of the member is less than the rate of travel of the car, means carried by the said member for controlling the operation of the car operating means, including cam devices located adjacent the car landings and cooperating with the means carried by the travelling member.

6. A car leveling mechanism for elevators comprising a travelling member, flexible means connecting the travelling member and the car, the connecting means being so constructed and arranged that the rate of travel of the member is one half or less than the rate of travel of the car, a switch device carried by the travelling member, means located adjacent the travelling member for automatically operating the switch devices on the member, said means being so located that should the travelling member pass in either direction between the desired stopping point the direction of movement of the car would be changed which would bring the car into registration with the platform or landing.

7. A leveling device for elevators comprising, in combination with the car, a travelling member located on guide tracks or ways independent of the car guides, a flexible connection between the car and travelling member for supporting said member to cause the same to be moved by the connection with the car but at a speed that is materially slower than the car, electrical circuit switch operated devices on the travelling member for varying the direction of the electric current to the car raising and lowering motors, and means adjacent the guides for operating the switches on the travelling member.

8. A leveling device for elevators comprising, in combination with the car, a travelling member located on guide tracks or ways independent of the car guides, a flexible connection between the car and travelling member for supporting said member to cause the same to be moved by the connection with the car but at a speed that is materially slower than the car, electrical circuit switch operated devices on the travelling member for varying the direction of the electric current to the car raising and lowering motors, and means adjacent the guides for operating the switches on the travelling member, said switch devices being normally retained in an inoperative position but capable of being moved to an operation circuit closing or opening position by the means adjacent the guides, as described.

9. A leveling device for the car of an electrically operated elevator comprising in combination, an electric two speed motor for raising and lowering the car, a travelling member, means for connecting the car and member together to cause them to move at the same time, the connection being such that the member travels at a materially slower rate or speed than the car, switch means carried by the member, and means at the landing for cooperating with the switch means for opening the circuit to the motor when it is operating the car on its slow speed whereby the car is leveled or brought to a position of rest at a landing.

10. A leveling device for the car of an elevator, comprising in combination, a motor for raising and lowering the car, means for varying the speed or rate of travel of the car, means for controlling the stopping position of the car at a landing including a travelling member, means for connecting the member to the car so that it travels at a materially slower speed than the car, and means located at the car landings which cooperate with the travelling member for stopping the motor or for reversing the direction of the travel of the car should it pass beyond its landing position.

NAPOLEON P. JULIEN.